United States Patent [19]
Ruszczyk et al.

[11] Patent Number: 5,615,212
[45] Date of Patent: Mar. 25, 1997

[54] METHOD, DEVICE AND ROUTER FOR PROVIDING A CONTENTION-BASED RESERVATION MECHANISM WITHIN A MINI-SLOTTED DYNAMIC ENTRY POLLING SLOT SUPPORTING MULTIPLE SERVICE CLASSES

[75] Inventors: Chester A. Ruszczyk, South Boston; Levent Gun, Hopkinton, both of Mass.

[73] Assignee: Motorola Inc., Schaumburg, Ill.

[21] Appl. No.: 526,517

[22] Filed: Sep. 11, 1995

[51] Int. Cl.⁶ .................................................. H04J 3/16
[52] U.S. Cl. ................... 370/433; 370/455; 340/825.08
[58] Field of Search .............................. 370/79, 82, 85.2, 370/85.3, 85.6, 85.7, 85.8, 94.1, 95.1, 95.2; 340/825.08, 825.5, 825.51, 825.54

[56] References Cited

U.S. PATENT DOCUMENTS 5,297,144  3/1994  Gilbert et al. ........................ 370/95.2
5,347,515  9/1994  Marino ................................. 370/85.2
5,440,560  8/1995  Rypinski .............................. 370/95.2

Primary Examiner—Alpus H. Hsu
Attorney, Agent, or Firm—Darleen J. Stockley

[57] ABSTRACT

The entry polling (EP) method (900) of the present invention primarily incorporates two types of polling: contention based and standard polling. The present invention provides several advantages over present polling approaches. EP slots allow multi-priority users to compete for access into the standard polling scheme. The reservation channel is efficiently used by dynamically adjusting the frequency of contention slots based on system dynamics and dynamically changing the number of contention minislots for each service category within a contention slot with the case of sending only one minislot per slot. The channel is assigned primarily to active users. Pipeline polling is also incorporated, thus providing full use of the upstream channel. Since the local state information is provided by the user, the central controller may allow multiple variable length packets to be sent.

5 Claims, 4 Drawing Sheets

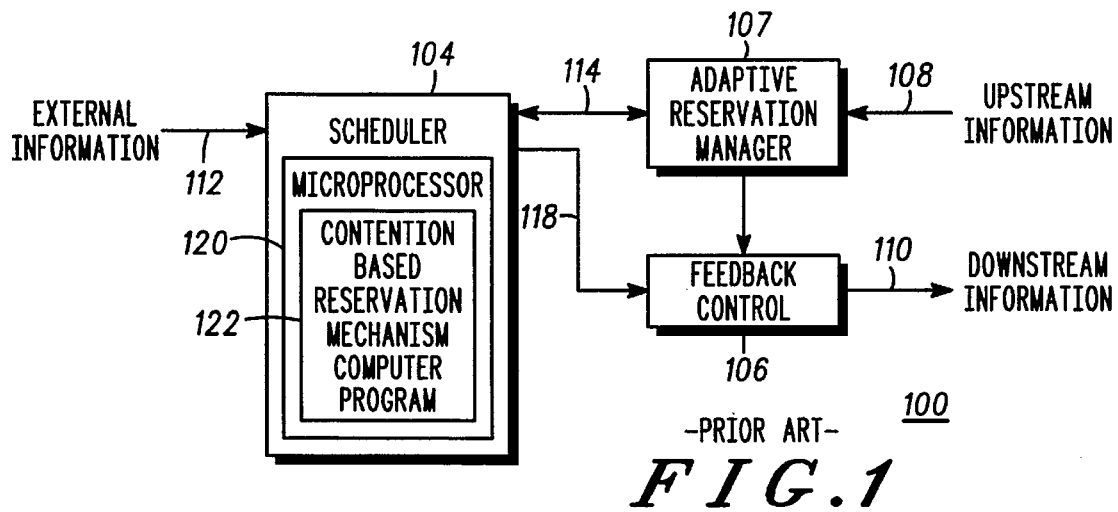
FIG.1 —PRIOR ART—
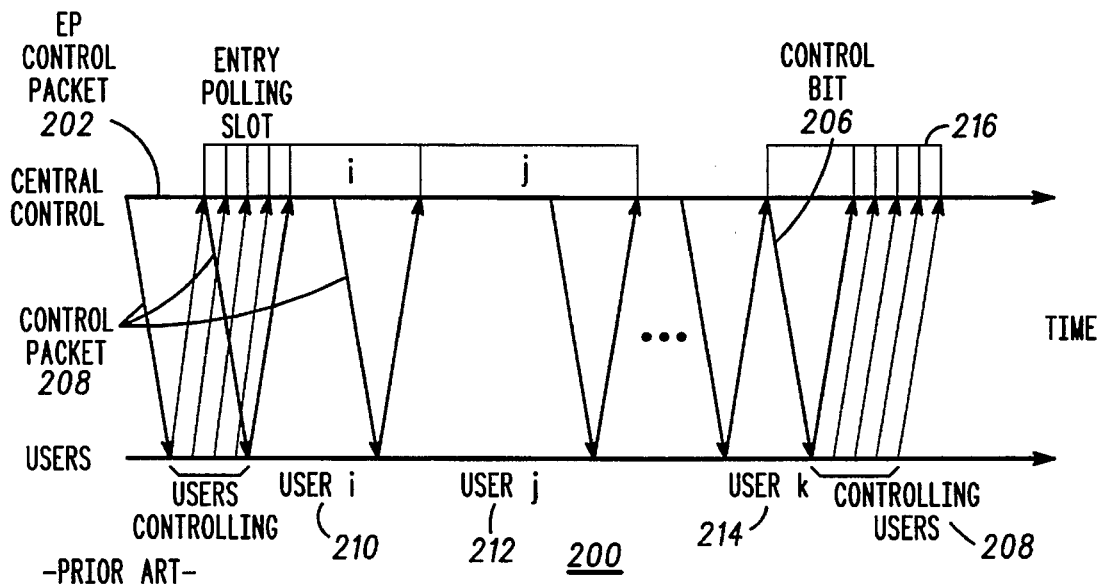
FIG.2 —PRIOR ART—
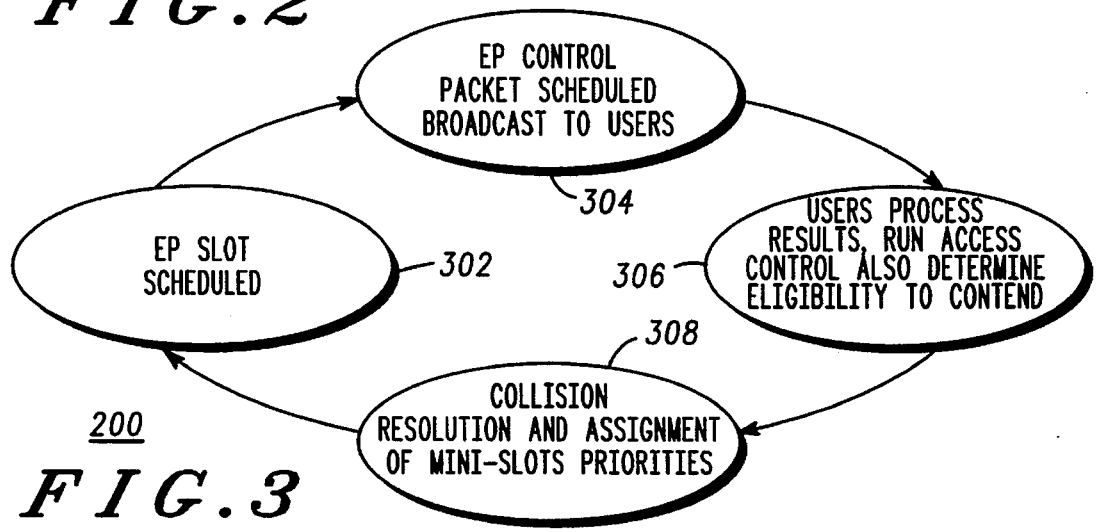
FIG.3

METHOD, DEVICE AND ROUTER FOR PROVIDING A CONTENTION-BASED RESERVATION MECHANISM WITHIN A MINI-SLOTTED DYNAMIC ENTRY POLLING SLOT SUPPORTING MULTIPLE SERVICE CLASSES

FIELD OF THE INVENTION

The present invention relates to dynamic entry polling for a communication system, and more particularly to a broadcast communication system having many users with multiple priorities.

BACKGROUND OF THE INVENTION

Polling is a method wherein a central controller asks users, i.e., polls the users, to see if the users have information to transmit, and then allows the users to transmit according to a predetermined scheme. Examples of these techniques include: roll call polling—where all users are polled in a determined order; hub polling—usually applied to a bus structure wherein the node that is the furthest distance from central controller is polled, and if it has no information to transmit, passes the poll to a neighbor and repeats this procedure until a node has information to send. Since the controller receives an id, the node that is to receive the next polling packet is known, and the process is repeated. The concept of polling is shown in FIG. 5, numeral 500.

The central controller polls all users, 502, regardless of whether the users have information to transmit. In the example shown in FIG. 5, user i 504, has information to transmit 506. Once the packet is received, then the central controller polls the next user based on one of the above techniques. In this example, user j 508 is polled, and sends a negative ACK (NAK), 509, back to the central controller stating that user j has no information to send. The central controller then polls the next user in a predetermined list, user k 510 and again receives a NAK 511. When the controller polls user l 512, information is transmitted on the upstream channel. It is clear that the above procedure may cause wasted bandwidth when users have no information to send.

To reduce the amount of wasted bandwidth on the channel, the concept of pipeline polling was developed, FIG. 6, numeral 600. The main difference between pipeline polling and regular polling is that some state information is supplied by the users to the central controller, and this state information determines how long the user will have the channel and sends out the next polling packet such that the time between users accessing the channel is minimized. Thus, while user i 604 is transmitting 606 to the central controller, the central controller knows a priori that user l 612 no longer requires the upstream channel and schedules user j 608 to access the channel by sending the polling control packet to user j 605 while user l 612 is tranmsitting. Using this technique, the channel is better utilized.

However, some bandwidth is still wasted due to users that do not have information to send and are required to send a negative acknowledgment (NAK) packet, thus still wasting bandwidth, 609, 611. If the system has many users, and the number of users that transfer information is small, then the delay will be large since all users are polled, and the channel will be dominated by NAK's.

Thus, there is a need for a method, device and router for reducing the amount of wasted bandwidth due to inactive users, defined as users with no information in the queue.

BRIEF DESCRIPTION OF THE DRAWINGS

FIG. 1 shows a block diagram of one embodiment of a device/router in accordance with the present invention.

FIG. 2 shows a schematic representation of entry polling in accordance with the present invention.

FIG. 3 shows a state transition diagram for a system in accordance with the present invention.

DETAILED DESCRIPTION OF A PREFERRED EMBODIMENT

The entry polling (EP) method of the present invention incorporates primarily two types of polling: contention based and standard polling. The present invention provides several advantages over present polling approaches. 1) EP slots allow multi-priority users to compete for access into the standard polling scheme. 2) The reservation channel is efficiently used by dynamically adjusting the frequency of contention slots based on system dynamics. Further efficiency is achieved by having the flexibility of dynamically changing the number of contention minislots for each service category within a contention slot with the case of sending only one minislot per slot (i.e., a contention slot per service class). 3) The channel is assigned primarily to active users, or users with information to send. 4) Pipeline polling is also incorporated, thus providing full use of the upstream channel. 5) Since the local state information is provided by the user, the central controller may allow multiple variable length packets to be sent.

Figure 10:
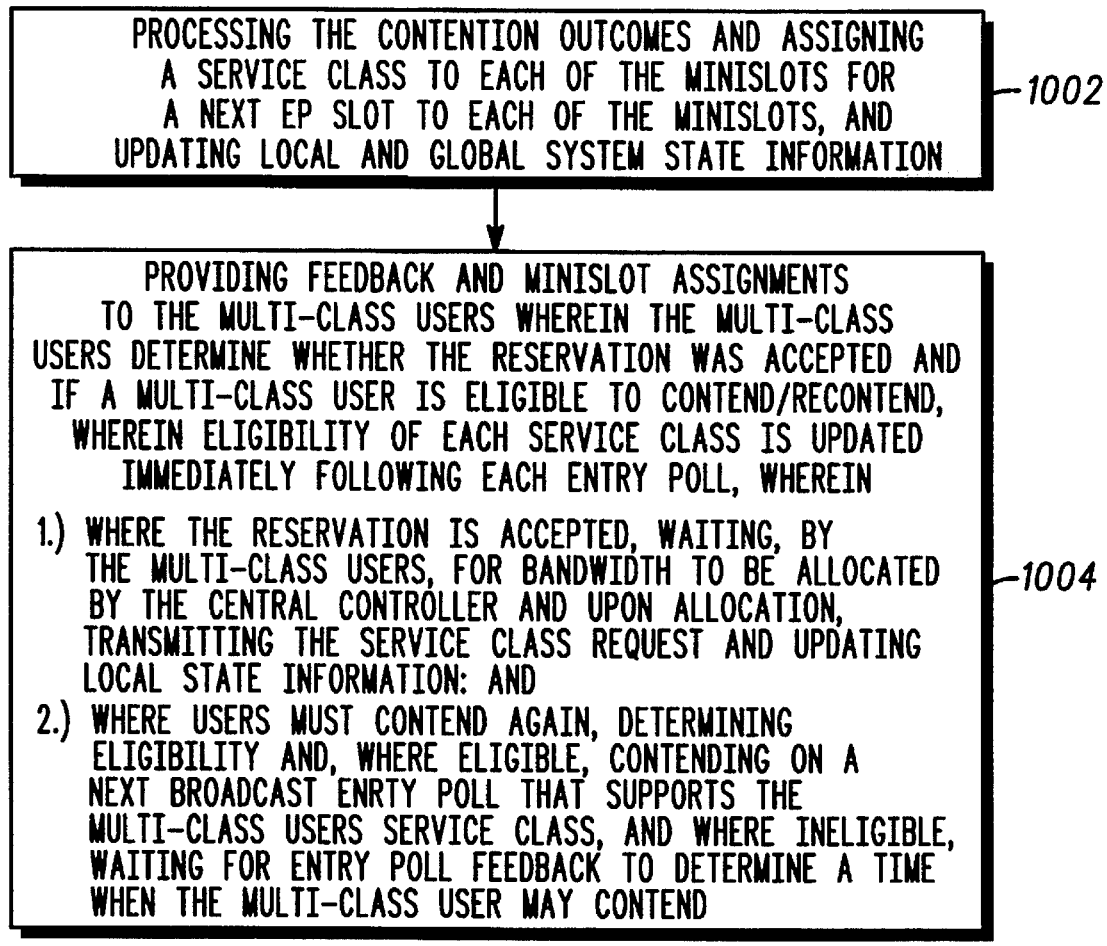
FIG. 10 is a flow chart showing one embodiment of steps for a computer program stored in memory for directing a microprocessor in the scheduler in accordance with the method of the present invention.

FIG. 1, numeral 100, shows a block diagram of a device/router for providing a contention-based reservation mechanism within a mini-slotted dynamic EP slot in a multiple-access communication system having a central controller with local and global system state information in accordance with the present invention. The device/router includes a scheduler 104 coupled to an adaptive reservation manager 107 and to receive external information, the adaptive reservation manager 107 coupled to the scheduler 104 and coupled to receive upstream channel information and a feedback control unit 106 coupled to the scheduler 104 and to the adaptive reservation manager 107. The scheduler 104 is a device/router having a microprocessor 120 that includes a computer program 122 embodying the contention-based reservation mechanism. The computer program, stored in memory, includes the steps of (as shown in FIG. 10, numeral 1000): upon contending, by a plurality of multi-class users, each having a service class, for minislots assigned to the service class to provide a reservation of an allocation of bandwidth for a service class request, providing contention outcomes, A) processing 1002 the contention outcomes and assigning a service class to each of the minislots for a next EP slot to each of the minislots, and updating local and global system state information; B) providing 1004 feedback and minislot assignments to the multi-class users wherein the multi-class users determine whether the reservation was accepted and if a multi-class user is eligible to contend/ recontend, wherein eligibility of each service class is updated immediately following each entry poll, wherein B1) where the reservation is accepted, waiting, by the multi-class users, for bandwidth to be allocated by the central controller and upon allocation, transmitting the service class request and updating local state information; and B2) where users must contend again, determining eligibility and, where eligible, contending on a next broadcast entry poll that supports the multi-class user's service class, and where ineligible, waiting for entry poll feedback to determine a time when the multiclass user may contend. Each service class defines a priority for a quality of service constraint. The system functions are described in a related patent application "Device, Router, Method And System For Providing A Hybrid Multiple Access Protocol For Users With Multiple Priorities", by the inventors of the present invention, filed concurrently.

For EP, the scheduler determines which priority class user is to receive dedicated bandwidth on the upstream channel and when users will be allowed to contend in an EP slot. An example of the timing diagram for how the scheduler incorporates EP slots into the downstream channel is shown in FIG. 2, numeral 200.

Figure 7:
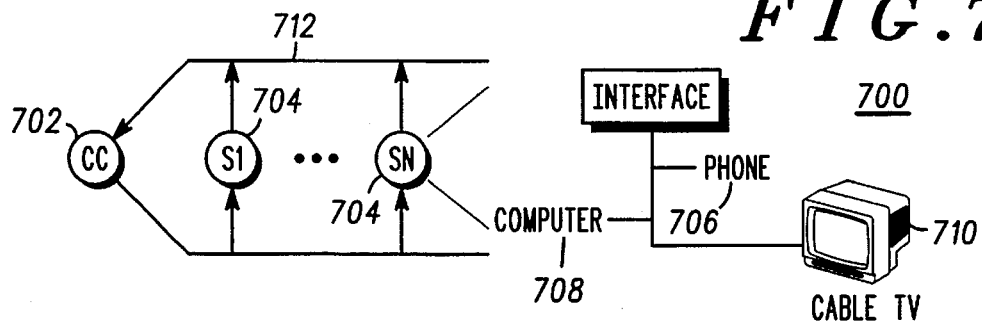
FIG. 7 shows an example of one embodiment of a system topology and architecture in accordance with the present invention.

The system wherein the invention is to be incorporated is shown in FIG. 7, numeral 700. The system is comprised of a central controller 702 and stations 704 which can be further subdivided into users of a specific priority class, 706, 708, 710, which require a specific quality of service contract to be arranged with the central controller, 702.

Figure 8:
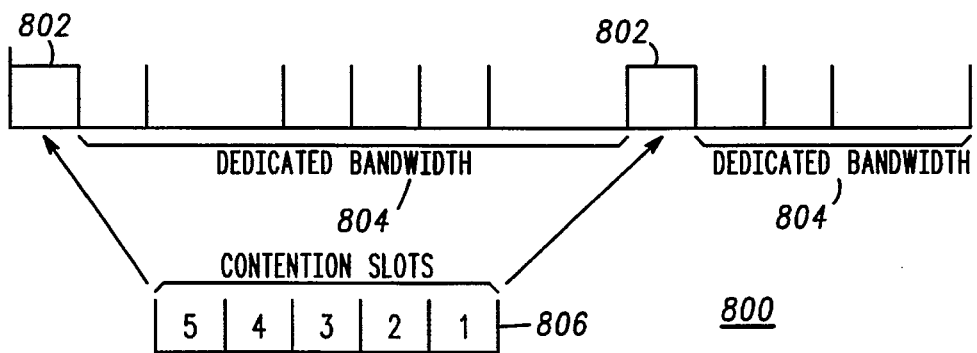
FIG. 8 illustrates a prior art method for classifying multiple access techniques based on control transfer.

The upstream channel, 712, used by stations to communicate to the central node, is defined by the central controller. The upstream channel consists of variable length slots at least of a predetermined minimum size, but smaller than a finite maximum length. The slots are further separated into one of two types: contention or dedicated, an example of which is shown in FIG. 8, numeral 800, again, which is determined by the central controller. Each contention slot, 802, is further decomposed into m>=1 subslots, 806, and dependent on system state information. The users in the contention state, 404, may contend only for subslots assigned with the same priority. The priority of the subslots is determined by the central controller. The dedicated bandwidth channel, 804, is assigned to active users that have secured a reservation and were polled by the central controller.

In correspondence with the timing diagram, the system operates in the states shown in FIG. 3, numeral 300. The states are: A) EP slot scheduled 302 by scheduler 104; B) EP control packet scheduled and broadcast to all users 304, scheduler 104 and feedback control 106; and C) users process the EP control packet and based on the user's present state 306, shown in FIG. 4 numeral 400, contention 404, determine eligibility to contend and which priority slot to contend for; and D) collision resolution process of the contending users and assignment of priorities to minislots in next entry poll 308, adaptive reservation manager 102. This process is repeated for a predetermined period of time.

When an EP control packet is broadcast to the users 202, the users process the results of the last contention EP slot and execute the medium access control (MAC) protocol described in the related patent cited above. The users determine eligibility based on the results and assignment of minislots to specific priority classes, and contend in a minislot within the EP slot, 204, determined by the MAC. The information is received and processed by the adaptive reservation manager, and the next EP slot is defined based on global and local information, 308. While the next EP slot is defined, the scheduler determines which users are active users 406, where active users are users that have successfully contended and are now being polled based on quality of service QOS contracts 208. In FIG. 2, the active users are user i, 210, user j, 212, through user k, 214. The scheduler also dynamically determines, based on global and local information, where the next EP control packet may be placed, 216. In general, if the number of active users is relatively low, then more EP control packets may be broadcasted for quick entry into the normal polling algorithm. If the number of active users is relatively large and the upstream channel is fully utilized, the number of EP control packets for determining the state of the system will be fewer.

The global information required here concerns information being transferred on the downstream channel to users' prior requests, which may be external sources such as client servers, phone, and cable. Thus, the EP control packet must be scheduled within this stream as shown in 202, 206.

After the next EP control packet is sent, 206, the contending users, 208, again determine eligibility and contend, 216, for access into the centrally controlled polling algorithm. The process is then repeated for each successive entry poll.

Figure 9:
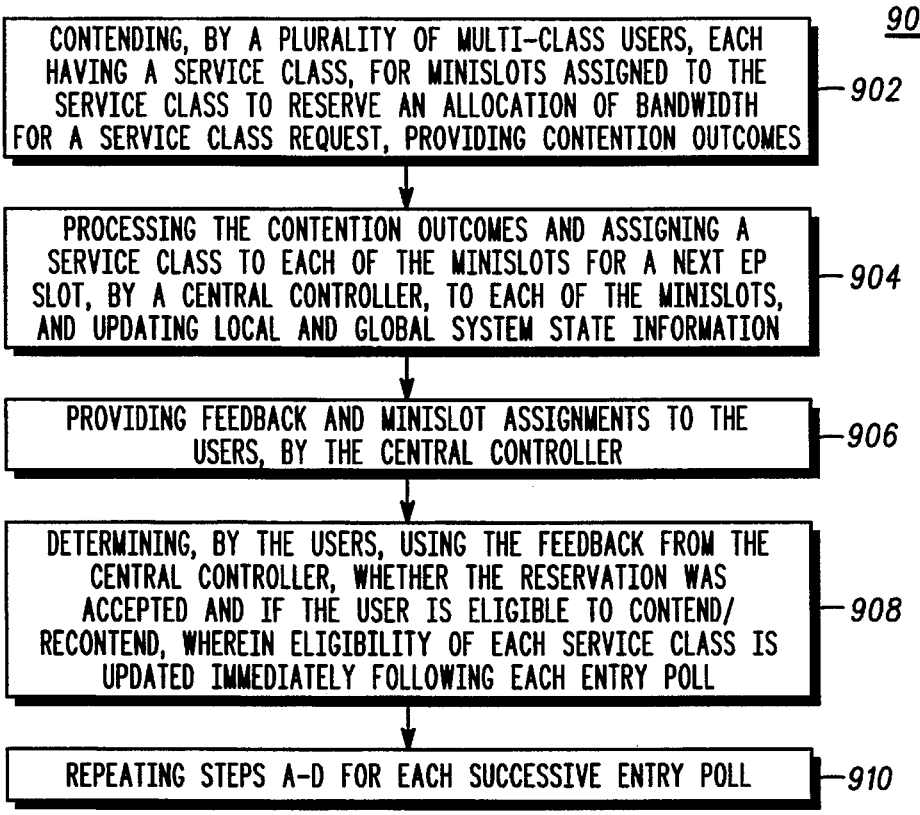
FIG. 9 is a flow chart showing one embodiment of steps of a method in accordance with the present invention.

FIG. 9, numeral 900, shows a flow chart of one embodiment of the method of the present invention for providing a contention-based reservation mechanism within a mini-slotted dynamic EP slot in a multiple-access communication system having a central controller with local and global system state information. The steps include: A) contending 902, by a plurality of multi-class users, each having a service class, for minislots assigned to the service class to reserve an allocation of bandwidth for a service class request, providing contention outcomes; B) processing the contention outcomes and assigning a service class to each of the minislots for a next EP slot 904, by a central controller, to each of the minislots, and updating local and global system state information; C) providing feedback and minislot assignments to the users 906, by the central controller; D) determining 908, by the users, using the feedback from the central controller, whether the reservation was accepted and if the user is eligible to contend/recontend, wherein eligibility of each service class is updated immediately following each entry poll; and E) repeating 910 steps A–D for each successive entry poll.

Step D may typically include: D1) where the reservation was accepted, waiting for bandwidth to be allocated by the central controller and upon allocation, transmitting the service class request and updating local state information; and D2) where users must contend again, determining eligibility and, where eligible, contending on a next broadcast entry poll that supports the user's service class, and where ineligible, waiting for entry poll feedback to determine when the user may contend. Each service class generally defines a priority for a quality of service constraint.

We claim:

1. A method for providing a contention-based reservation mechanism within a mini-slotted dynamic Entry Polling (EP) slot in a multiple-access communication system having a central controller with local and global system state information, comprising:

A) contending, by a plurality of multi-class users, each having a service class, for minislots assigned to the service class to reserve an allocation of bandwidth for a service class request, providing contention outcomes;

B) processing the contention outcomes and assigning a service class to each of the minislots for a next mini-slotted dynamic EP slot, by a central controller, to each of the minislots, and updating the local and global system state information;

C) providing feedback and minislot assignments to the users, by the central controller;

D) determining, by the users, using the feedback from the central controller, whether the reservation was accepted and if the user is eligible to contend/recontend, wherein eligibility of each service class is updated immediately following an entry poll; and E) repeating steps A–D for each successive entry poll.

2. The method of claim 1 wherein step D includes:

D1) where the reservation was accepted, waiting for bandwidth to be allocated by the central controller and upon allocation, transmitting the service class request and updating local state information; and D2) where users must contend again, determining eligibility and,
where eligible, contending on a next broadcast entry poll that supports the user's service class, and
where ineligible, waiting for entry poll feedback to determine when the user may contend.

3. The method of claim 1 wherein each service class defines a priority for a quality of service constraint.

4. A device/router for providing a contention-based reservation mechanism within a mini-slotted dynamic Entry Polling (EP) slot in a multiple-access communication system having a central controller with the local and global system state information, having a microprocessor that includes a computer program embodying the contention-based reservation mechanism and the computer program, stored in memory, for:

upon contending, by a plurality of multi-class users, each having a service class, for minislots assigned to the service class to provide a reservation of an allocation of bandwidth for a service class request, providing contention outcomes, wherein the computer program comprises:

A) means for processing the contention outcomes and assigning a service class to each of the minislots for a next mini-slotted dynamic EP slot to each of the minislots, and updating local and global system state information;

B) means for providing feedback and minislot assignments to the multi-class users wherein the multi-class users determine whether the reservation was accepted and if a multi-class user is eligible to contend/recontend, wherein eligibility of each service class is updated immediately following an entry poll, wherein B1) where the reservation is accepted, means for waiting, by the multi-class users, for bandwidth to be allocated by the central controller and upon allocation, transmitting the service class request and updating local state information; and B2) where users must contend again, means for determining eligibility and,
where eligible, contending on a next broadcast entry poll that supports the multi-class user's service class, and
where ineligible, waiting for entry poll feedback to determine a time when the multi-class user may contend.

5. The device/router of claim 4 wherein each service class defines a priority for a quality of service constraint.

* * * * *

UNITED STATES PATENT AND TRADEMARK OFFICE
CERTIFICATE OF CORRECTION

PATENT NO. : 5,615,212
DATED : Mar. 25, 1997
INVENTOR(S) : Chester A. Ruszczyk, et al.

It is certified that error appears in the above-identified patent and that said Letters Patent is hereby corrected as shown below:

In the Drawings:
  Sheet 1:
    in Fig. 1:
      delete "-PRIOR ART-";
    in Fig. 2:
      delete "-PRIOR ART-";
      change "CENTRAL CONTROL" to --CENTRAL CONTROLLER--;
      change "USERS CONTROLLING" to --USERS CONTENDING--;
      change "CONTROLLING USERS" to --CONTENDING USERS--;
      change "CONTROL BIT" to --CONTROL PKT--;
    in Fig. 3:
      change "200" to --300--;
      change "ALSO" to --ALGO,--;

UNITED STATES PATENT AND TRADEMARK OFFICE
CERTIFICATE OF CORRECTION

PATENT NO. : 5,615,212
DATED : Mar. 25, 1997
INVENTOR(S) : Chester A. Ruszczyk, et al.

Figure 4:
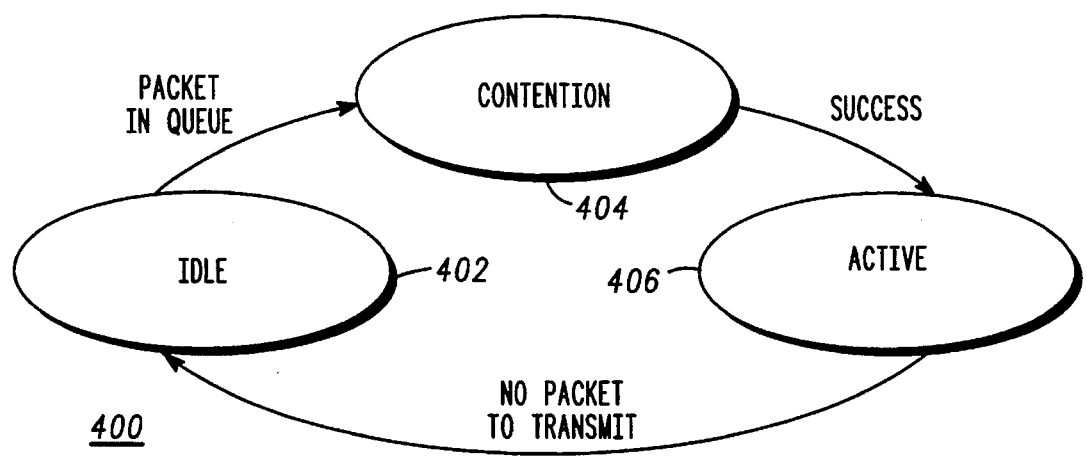
FIG. 4 shows a state transition diagram of users in a system in accordance with the present invention.
Figure 5:
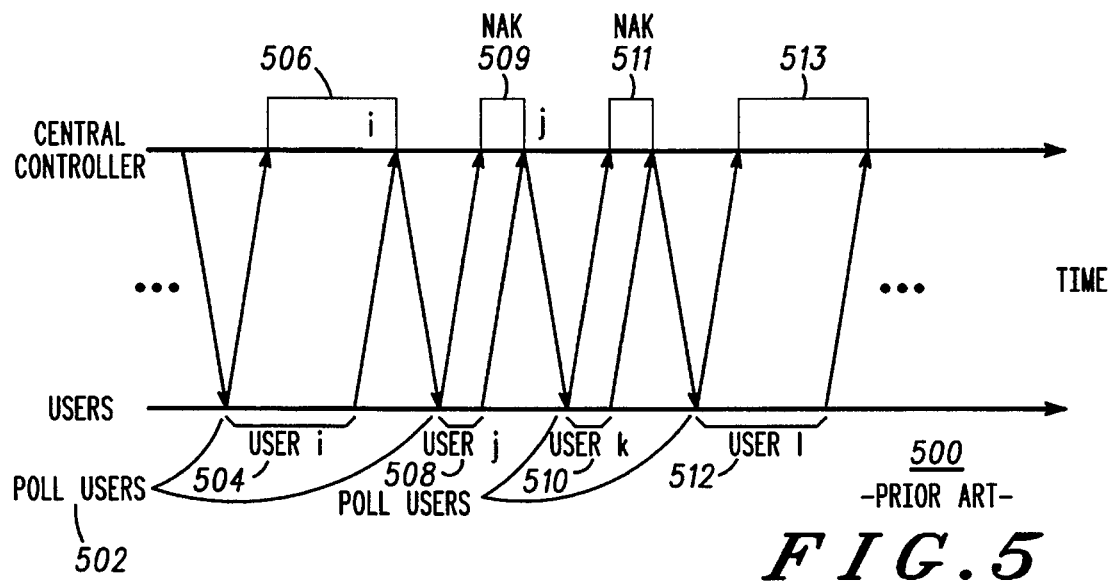
FIG. 5 is a schematic representation of the flow of information in a polling system as is known in the art.
Figure 6:
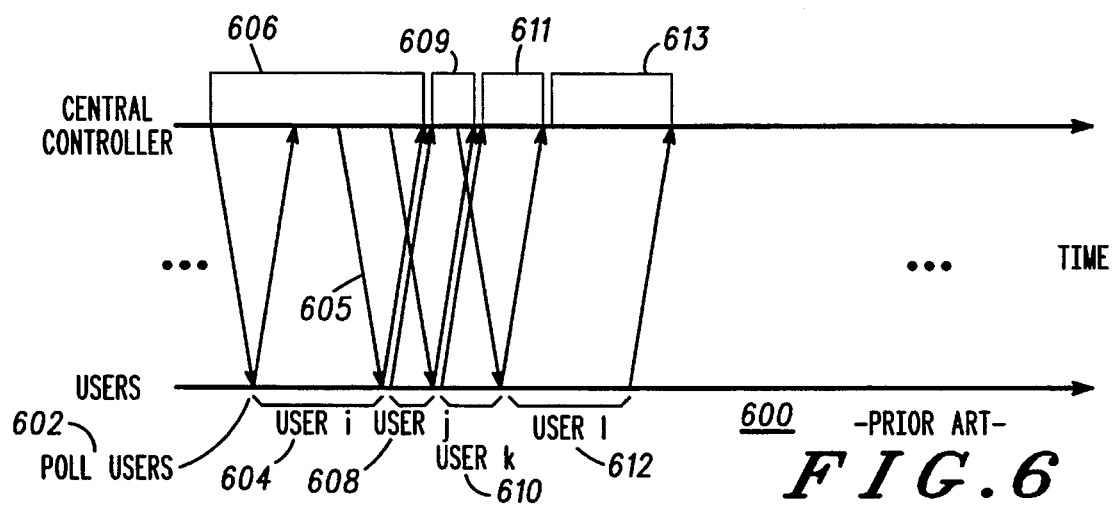
FIG. 6 is a schematic representation of the flow of information in a pipeline polling system as is known in the art.

It is certified that error appears in the above-identified patent and that said Letters Patent is hereby corrected as shown below:

Sheet 2:
    in Fig. 4:
        change "NO PACKET" to --NO PACKETS--;
Sheet 3:
    in Fig. 8:
        insert --PRIOR ART-- after "800";
Sheet 4:
    in Fig. 10, box 1004, line 15:
        change "USERS SERVICE" to --USER'S SERVICE--.

Signed and Sealed this

Fifteenth Day of December, 1998

Attest:

BRUCE LEHMAN

*Attesting Officer*  *Commissioner of Patents and Trademarks*